United States Patent
Nasu et al.

(10) Patent No.: US 11,990,640 B2
(45) Date of Patent: May 21, 2024

(54) α-ALUMINA, SLURRY, POROUS MEMBRANE, LAMINATED SEPARATOR, AND NONAQUEOUS ELECTROLYTE SECONDARY BATTERY AND METHOD FOR PRODUCING SAME

(71) Applicant: SUMITOMO CHEMICAL COMPANY, LIMITED, Tokyo (JP)

(72) Inventors: Tomomichi Nasu, Niihama (JP); Syunsuke Sakamoto, Niihama (JP); Hirotaka Ozaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 519 days.

(21) Appl. No.: 17/417,012

(22) PCT Filed: Dec. 24, 2019

(86) PCT No.: PCT/JP2019/050452
§ 371 (c)(1),
(2) Date: Jun. 21, 2021

(87) PCT Pub. No.: WO2020/138014
PCT Pub. Date: Jul. 2, 2020

(65) Prior Publication Data
US 2022/0077541 A1  Mar. 10, 2022

(30) Foreign Application Priority Data
Dec. 26, 2018 (JP) .................... 2018-242924

(51) Int. Cl.
*H01M 50/434* (2021.01)
*C01F 7/441* (2022.01)
*H01M 50/443* (2021.01)
*H01M 50/449* (2021.01)

(52) U.S. Cl.
CPC ........... *H01M 50/434* (2021.01); *C01F 7/441* (2013.01); *H01M 50/443* (2021.01); *H01M 50/449* (2021.01); *C01P 2002/60* (2013.01); *C01P 2002/90* (2013.01); *C01P 2004/61* (2013.01); *C01P 2006/12* (2013.01); *C01P 2006/40* (2013.01)

(58) Field of Classification Search
CPC ............. H01M 50/434; H01M 50/443; H01M 50/449; C01F 7/441; C01P 2002/60; C01P 2002/90; C01P 2004/61; C01P 2006/12; C01P 2006/40
See application file for complete search history.

(56) References Cited

U.S. PATENT DOCUMENTS

| | | | |
|---|---|---|---|
| 2010/0167055 A1* | 7/2010 | Ozaki | C01F 7/441 423/625 |
| 2011/0123805 A1* | 5/2011 | Ozaki | C30B 35/007 423/625 |
| 2015/0030933 A1* | 1/2015 | Goetzen | H01M 50/403 429/251 |
| 2015/0104375 A1* | 4/2015 | Ozaki | C30B 15/00 423/625 |
| 2015/0203686 A1* | 7/2015 | Ozaki | H01M 50/451 106/286.5 |
| 2016/0351880 A1* | 12/2016 | Yamada | C01F 7/026 |
| 2017/0054122 A1* | 2/2017 | Egawa | H01M 10/0566 |
| 2018/0316053 A1* | 11/2018 | Kurakane | H01M 50/417 |
| 2018/0351147 A1* | 12/2018 | Ozaki | C01F 7/02 |

FOREIGN PATENT DOCUMENTS

| | | | |
|---|---|---|---|
| JP | 10-101329 | * | 4/1998 |
| JP | H10-101329 A | | 4/1998 |
| JP | H11-268911 A | | 10/1999 |
| JP | 2004-227972 A | | 8/2004 |
| JP | 2008-137838 A | | 6/2008 |
| JP | 2008137838 | * | 6/2008 |
| JP | 2018-138509 A | | 9/2018 |
| WO | WO 0151202 | * | 7/2001 |
| WO | WO-2014/017662 A1 | | 1/2014 |
| WO | WO-2016/093242 A1 | | 6/2016 |
| WO | WO-2016/098579 A1 | | 6/2016 |

OTHER PUBLICATIONS

JP 10-101329MT (Year: 1998).*
JP 2008137838MT (Year: 2008).*
Office Action issued in corresponding Chinese Patent Application No. 201980085354.1, dated Oct. 31, 2022.
International Searching Authority, "International Search Report," issued in connection with International Patent Application No. PCT/JP2019/050452, dated Mar. 24, 2020.
International Searching Authority, "Written Opinion," issued in connection with International Patent Application No. PCT/JP2019/050452, dated Mar. 24, 2020.

* cited by examiner

*Primary Examiner* — Alexander Usyatinsky
(74) *Attorney, Agent, or Firm* — Foley & Lardner LLP

(57) ABSTRACT

An object of the present invention is to provide an alumina used for a slurry for reducing unevenness in a surface of a porous membrane. The present invention is an α-alumina wherein a crystallite size obtained by a Rietveld analysis is not greater than 95 nm, and a lattice strain obtained by the Rietveld analysis is not greater than 0.0020. A BET specific surface area by a nitrogen adsorption method of the α-alumina is preferably not greater than 10 m²/g. A particle diameter D50 equivalent to 50% cumulative percentage by volume of the α-alumina is also preferably not greater than 2 μm.

11 Claims, No Drawings

α-ALUMINA, SLURRY, POROUS MEMBRANE, LAMINATED SEPARATOR, AND NONAQUEOUS ELECTROLYTE SECONDARY BATTERY AND METHOD FOR PRODUCING SAME

CROSS-REFERENCE TO RELATED APPLICATIONS

The present application claims priority under 37 U.S.C. § 371 to International Patent Application No. PCT/JP2019/050452, filed Dec. 24, 2019, which claims priority to and the benefit of Japanese Patent Application No. 2018-242924, filed on Dec. 26, 2018. The contents of these applications are hereby incorporated by reference in their entireties.

TECHNICAL FIELD

The present invention relates to an a-alumina, a slurry, a porous membrane, a laminated separator, and a nonaqueous electrolyte secondary battery, and a method for producing the same.

BACKGROUND ART

A nonaqueous electrolyte secondary battery, in particular, a lithium ion secondary battery is used for compact household devices such as mobile phones and personal computers because of its high energy density, and is acceleratingly applied also to automobiles in addition to the compact devices in recent years.

In the nonaqueous electrolyte secondary battery, a porous separator is disposed between a positive electrode and a negative electrode in general. The separator retains electrolyte and assures electric conductivity between the positive electrode and the negative electrode, and also separates the positive electrode and the negative electrode from each other to prevent short-circuiting between the positive electrode and the negative electrode. Furthermore, the separator has a shutdown function by melting the separator itself and closing pores in a case where a temperature inside the battery becomes high due to some abnormality. The electric conductivity inside the battery is lost by the shutdown function, and the battery is thus maintained safe. However, if the battery temperature becomes higher than or equal to a predetermined temperature, the separator is abruptly contracted, and short-circuiting may thus occur between the positive electrode and the negative electrode, and a problem in safety arises.

In order to solve such a problem, for example, Patent Document 1 discloses a separator, for use in a nonaqueous electrolyte secondary battery, in which a porous membrane made of a heat-resistant material and a porous membrane made of polyolefin are laminated. Patent Document 1 indicates that the separator for use in a nonaqueous electrolyte secondary battery has excellent dimensional stability at a high temperature in a case where a porous membrane made of a water-soluble polymer is used as the porous membrane made of the heat-resistant material. According to the disclosure of Patent Document 1, a liquid containing the water-soluble polymer, particulates, and a medium is applied to a polyolefin porous membrane, and the medium is thereafter removed, thereby obtaining the separator, for use in a nonaqueous electrolyte secondary battery, in which the porous membrane made of the water-soluble polymer and the porous membrane made of the polyolefin are laminated. According to the disclosure, particulates made of an inorganic substance such as titanium oxide and alumina are used as the particulates.

PRIOR ART DOCUMENTS

PATENT DOCUMENTS

Patent document 1: JP2004-227972A

SUMMARY OF THE INVENTION

PROBLEMS TO BE SOLVED BY THE INVENTION

If a surface of the porous membrane made of the heat-resistant material has unevenness, the separator for use in a nonaqueous electrolyte secondary battery may be punctured due to the unevenness when, for example, pressed during assembly of the nonaqueous electrolyte secondary battery. A withstanding voltage of the separator for use in the nonaqueous electrolyte secondary battery is lowered at the punctured portion. Therefore, the unevenness may act as a starting point of the short-circuiting between the positive electrode and the negative electrode. However, in Patent Document 1, the unevenness of the porous membrane made of the heat-resistant material is not considered at all.

Therefore, an object of the present invention is to provide an alumina used for a slurry for reducing unevenness in a surface of a porous membrane by focusing particularly on alumina as inorganic particles for forming the porous membrane, and further provide a slurry containing the alumina, a porous membrane containing the alumina, a separator including the porous membrane, a nonaqueous electrolyte secondary battery in which the alumina is formed on at least one of surfaces of a positive electrode, a negative electrode, and the separator, and a method for producing the nonaqueous electrolyte secondary battery.

SOLUTION TO THE PROBLEMS

The present invention which achieved the above problems is as follows.
[1] An α-alumina wherein
   a crystallite size obtained by a Rietveld analysis is not greater than 95 nm, and
   a lattice strain obtained by the Rietveld analysis is not greater than 0.0020.
[2] The α-alumina according to [1], wherein a BET specific surface area by a nitrogen adsorption method is not greater than 10 m$^2$/g.
[3] The α-alumina according to [1] or [2], wherein a particle diameter D50 equivalent to 50% cumulative percentage by volume is not greater than 2 μm.
[4] The α-alumina according to any one of [1] to [3], wherein
   the crystallite size is not less than 50 nm and not greater than 95 nm, and
   the lattice strain is not less than 0.0001 and not greater than 0.0010.
[5] A slurry comprising:
   the α-alumina according to any one of [1] to [4];
   a binder; and
   a solvent.
[6] A porous membrane comprising the α-alumina according to any one of [1] to [4].

[7] A laminated separator comprising:
   a separator; and
   the porous membrane, according to [6], laminated on at least one of surfaces of the separator.

[8] A nonaqueous electrolyte secondary battery comprising:
   a positive electrode;
   a negative electrode;
   a nonaqueous electrolyte; and
   a separator, wherein
   the porous membrane according to [6] is formed on at least one of surfaces of the positive electrode, the negative electrode, and the separator.

[9] A method for producing a nonaqueous electrolyte secondary battery comprising a positive electrode, a negative electrode, a nonaqueous electrolyte, and a separator, the method comprising:
   applying the slurry according to [5] to at least one of surfaces of the positive electrode, the negative electrode, and the separator; and
   drying the slurry to form a porous membrane on the at least one of the surfaces.

ADVANTAGEOUS EFFECTS OF THE INVENTION

The alumina according to the present invention allows suppression of unevenness of a porous layer obtained from a slurry since no coarse aggregates are formed in the slurry.

DESCRIPTION OF EMBODIMENTS

The inventors of the present invention have found that α-alumina with a crystallite size obtained by Rietveld analysis of not greater than 95 nm and a lattice strain obtained by the Rietveld analysis of not greater than 0.0020 is well dispersed in a slurry, and does not form coarse aggregates in the slurry, as a result of examination.

In the α-alumina of the present invention, a crystallite size obtained by the Rietveld analysis is not greater than 95 nm, and a lattice strain by the Rietveld analysis is not greater than 0.0020. A specific method of the Rietveld analysis is as follows.

X-ray diffraction measurement is firstly performed for a powder sample of the α-alumina by a 2θ/θ method, to obtain actual-measurement data of an X-ray diffraction profile. Rietveld analysis is performed for the obtained data with RIETAN-FP by regarding the crystal structure of the alumina as α-alumina. The α-alumina has a hexagonal crystal structure, and has a corundum structure with space group R-3c.

An integral breadth and a value of 2θ at each of peaks derived from $K\alpha_1$ at 2θ values of 40° to 80° are obtained from the result of the Rietveld analysis, and the crystallite size and the lattice strain are assessed by the Halder-Wagner method. In the assessment according to the Halder-Wagner method, the integral breadth and the 2θ value at each peak are substituted into the following Halder-Wagner equation, and plotting is performed such that the vertical axis represents $(\beta/\tan\theta)^2$ and the horizontal axis represents $\beta/(\tan\theta\sin\theta)$. Subsequently, linear fitting of the obtained plot is performed to obtain a gradient and an intercept, and the crystallite size and the lattice strain are obtained based on the values of the gradient and the intercept.

Halder-Wagner equation: $(\beta/\tan\theta)^2 = (K\lambda/D) \times \beta/(\tan\theta\sin\theta) + 16\varepsilon^2$ In the Halder-Wagner equation, β represents an integral breadth, θ represents a diffraction angle at the X-ray diffraction measurement using the 2θ/θ method, K represents a Scherrer constant, λ represents a wavelength of an X-ray, D represents a crystallite size, and ε represents a lattice strain. In the Halder-Wagner equation, the Scherrer constant K is 4/3 and the wavelength λ of the X-ray is 1.50406 Å.

The α-alumina of the present invention has an α phase as the main crystalline phase. The main crystalline phase is determined based on a CuKα characteristic X-ray diffraction pattern. In general, in the α phase, the θ phase, the δ phase, the Y phase, and the κ phase known as the crystal phases of alumina, peaks appear at the following positions in the CuKα characteristic X-ray diffraction pattern. A phase corresponding to a peak having the highest intensity among the peaks appearing at the following positions is determined as the main crystalline phase.
   α phase: 2θ=57.5°
   θ phase: 2θ=32.7°
   δ phase: 2θ=36.5°
   Y phase: 2θ=45.4°
   κ phase: 2θ=42.9°

The crystallite size is preferably not greater than 90 nm and more preferably not greater than 87 nm. The lower limit thereof is not particularly limited to, and for example, 50 nm. The lattice strain is preferably not greater than 0.0015 and more preferably not greater than 0.0010. The lower limit thereof is not particularly limited to, and for example, 0.0001.

In the α-alumina of the present invention, a BET specific surface area by a nitrogen adsorption method is preferably not greater than 10 m²/g, more preferably not greater than 8 m²/g, and even more preferably not greater than 6 m²/g. The lower limit thereof is not particularly limited to, and for example, 2 m²/g. In the α-alumina of the present invention, a ratio of a BET specific surface area by a water adsorption method to the BET specific surface area by a nitrogen adsorption method is preferably not greater than 1.3, more preferably not greater than 1.0, and even more preferably not greater than 0.8. The lower limit thereof is not particularly limited to, and for example, 0.3. The BET specific surface area by a nitrogen adsorption method and the ratio of the BET specific surface area by a water adsorption method to the BET specific surface area by a nitrogen adsorption method are each an index indicating how easy the α-alumina adsorbs water, and the less the value of the index is, the more difficult water adsorption is. Therefore, in a case where the α-alumina in which the BET specific surface area by a nitrogen adsorption method or the ratio of the BET specific surface area by a water adsorption method to the BET specific surface area by a nitrogen adsorption method is low, is used for a secondary battery, an amount of water that is brought into the battery is small.

In the α-alumina of the present invention, a particle diameter D50 equivalent to 50% cumulative percentage by volume is preferably not greater than 2 μm. In a case where the D50 is not greater than 2 μm, generation of coarse particles in a slurry can be easily suppressed. The D50 is more preferably not greater than 1.8 μm and even more preferably not greater than 1.5 μm. The lower limit thereof is not particularly limited to, and for example, 0.6 μm. In the α-alumina of the present invention, a particle diameter D90 equivalent to 90% cumulative percentage by volume is preferably not greater than 3.3 μm. In a case where the D90 is not greater than 3.3 μm, generation of coarse particles in the slurry can be easily suppressed. The D90 is more preferably not greater than 3.0 μm and even more preferably not greater than 2.7 μm. The lower limit thereof is not particularly limited to, and for example, 1.5 μm. The D50 and the D90 in the α-alumina of the present invention, can be assessed by measuring 0.2 mass % of aqueous sodium hexametaphosphate solution having alumina powder dispersed therein, using a laser diffraction method, as described below in examples.

The α-alumina of the present invention can be produced by a method that includes, for example, obtaining aluminum hydroxide by a Bayer process, calcining the aluminum hydroxide to obtain raw material alumina, and pulverizing the raw material alumina. The pulverizing is preferably performed by, for example, a method using a jet mill in which an object to be pulverized is less likely to be strained. Thus obtained α-alumina can satisfy the crystallite size and the lattice strain in ranges specified in the present invention. In a case where the crystallite size and the lattice strain are adjusted to be in the ranges specified in the present invention, the α-alumina particles have such particulate sizes as to be well dispersed in a slurry, and the lattice strain is low and the surface activity is low, the particulates are thus unlikely to be re-aggregated, and coarse aggregates are unlikely to be formed in the slurry.

In the aluminum hydroxide obtained by the Bayer process, a particle diameter D50 equivalent to 50% cumulative percentage by volume is preferably not greater than 40 μm, more preferably not greater than 25 μm, and even more preferably not greater than 10 μm. The lower limit of the D50 of the aluminum hydroxide is not particularly limited to, and for example, 0.5 μm.

A BET specific surface area of the aluminum hydroxide is preferably not less than 1.0 $m^2/g$ and more preferably not less than 1.3 $m^2/g$, and generally not greater than 2.5 $m^2/g$. In the aluminum hydroxide, an amount of Na is preferably not greater than 0.10 mass % and more preferably not greater than 0.05 mass %, and generally not less than 0.005 mass %.

The aluminum hydroxide can be produced by referring to the method disclosed in, for example, JP2010-208933A or JP2010-155770A.

A temperature at which the aluminum hydroxide is calcined needs to be adjusted depending on a state of the aluminum hydroxide, a heating rate, a calcination time, a cooling rate, or the like. However, the temperature is preferably higher than 1200° C. for obtaining the α phase as the main crystalline phase of the raw material alumina after the calcining.

The atmosphere for the calcining is not particularly limited to, and may be an air atmosphere, an inert gas atmosphere such as a nitrogen gas or argon gas atmosphere, a reducing atmosphere, or the like.

A furnace used for the calcining is not particularly limited to, and for example, a tunnel kiln, a roller hearth kiln, a pusher kiln, a shuttle kiln, an elevator kiln, a muffle kiln, a rotary kiln, a tubular kiln, a fluidized bed kiln, or the like.

In the raw material alumina, a BET specific surface area by a nitrogen adsorption method is preferably not less than 2.0 $m^2/g$ and not greater than 5.0 $m^2/g$, and more preferably not less than 3.0 $m^2/g$ and not greater than 4.5 $m^2/g$. In the raw material alumina, a particle diameter D50 equivalent to 50% cumulative percentage by volume is preferably not less than 1 μm and not greater than 40 μm, and more preferably not less than 1 μm and not greater than 20 μm.

In a case where the raw material alumina is pulverized by using a jet mill, a rate at which the raw material alumina is fed is, for example, not less than 5 kg/h and not higher than 15 kg/h, and a gauge pressure at an air supply port in pulverizing is, for example, not less than 0.1 MPa and not higher than 1.5 MPa. When the raw material alumina is pulverized, an adhesion inhibitor is preferably used. As the adhesion inhibitor, polyalcohol such as propylene glycol and polyethylene glycol can be used.

The present invention also includes a slurry that contains the α-alumina of the present invention, a binder, and a solvent.

As the binder, a known one that is mainly constituted by an organic substance can be used. The binder can be used for binding alumina particles to each other in a porous membrane described below and adhering the porous membrane and a separator described below to each other or adhering the porous membrane to a negative electrode and/or a positive electrode described below to each other. Specific examples of the binder include fluororesins such as polyvinylidene fluoride (PVDF), polytetrafluoroethylene (PTFE), and tetrafluoroethylene-hexafluoropropylene copolymers (FEP); polyacrylic acid derivatives such as polyacrylic acid, polymethyl acrylate, polyethyl acrylate, and polyhexyl acrylate; polymethacrylic acid derivatives such as polymethacrylic acid, polymethyl methacrylate, polyethyl methacrylate, and polyhexyl methacrylate; polyamide, polyimide, polyamideimide, polyvinyl acetate, polyvinylpyrrolidone, polyether, polyethersulfone, hexafluoropolypropylene, styrene-butadiene rubber, carboxymethyl cellulose (hereinafter, referred to as CMC), polyacrylonitrile and derivatives thereof, polyethylene, polypropylene, aramid resin and the like, and salts thereof. One of them may be used alone or a mixture of two or more of them may be used.

As the binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene, may be used.

As the solvent, a known one can be used. Specific examples of the solvent include water, alcohol, acetone, tetrahydrofuran, methylene chloride, chloroform, dimethylformamide, N-methyl-2-pyrrolidone (NMP), cyclohexane, xylene, cyclohexanone, and mixed solvents thereof A content of the binder in the slurry of the present invention is not particularly limited to, and preferably not less than 0.1 parts by mass and not greater than 20 parts by mass with respect to 100 parts by mass of the α-alumina of the present invention. A content of the solvent in the slurry of the present invention is not particularly limited to, preferably not less than 10 parts by mass and not greater than 500 parts by mass with respect to 100 parts by mass of the α-alumina of the present invention.

The slurry of the present invention may include various additives such as a dispersant, a thickener, a leveling agent, an antioxidant, a defoamer, a pH adjustor containing acid or alkali, and an additive having a function of reducing a side reaction such as decomposition of an electrolyte, in order to enhance dispersion stabilization, coatability, and the like. The various additives are not particularly limited as long as the various additives are chemically stable and do not exert a great influence on reaction of a battery in a range in which a nonaqueous electrolyte secondary battery is used. Additives capable of being removed at the time of forming the porous membrane described below are preferable as the various additives. However, the additives may remain in the porous membrane described below. A content of the various additives is not particularly limited to, and preferably not greater than 10 parts by mass with respect to 100 parts by mass of the α-alumina of the present invention.

The slurry of the present invention can be prepared by mixing the α-alumina of the present invention, the binder, and the solvent, and dispersing the α-alumina of the present invention and the binder in the solvent. The dispersion method is not particularly limited to, and may be a stirring method using a known planetary mixer or the like, a method using ultrasonic application, or a method using a bead mill.

The α-alumina of the present invention has the crystallite size and the lattice strain described above, and, thus, does not form coarse particles in the slurry of the present invention. More specifically, in the slurry of the present invention, a particle diameter D90 equivalent to 90% cumulative percentage by volume of the α-alumina of the present invention is preferably not greater than 10 μm, and the D90 is more preferably not greater than 8 μm and even more preferably not greater than 5 μm. The lower limit thereof is not particularly limited to, and 1.0 μm. In the slurry of the present invention, a particle diameter D100 equivalent to 100% cumulative percentage by volume of the α-alumina of the present invention is preferably not greater than 30 μm, and the D100 is more preferably not greater than 20 μm and even more preferably not greater than 10 μm. The lower limit thereof is not particularly limited to, and for example, 2.0 μm. In the slurry of the present invention, a particle diameter D50 equivalent to 50% cumulative percentage by volume of the α-alumina of the present invention is, for example, not less than 0.5 μm and not greater than 5 μm.

The porous membrane obtained from the slurry of the present invention is, that is, the porous membrane that contains the α-alumina of the present invention, and has high heat resistance and insulating properties. The porous membrane obtained from the slurry of the present invention preferably contains the α-alumina of the present invention and the binder. The porous membrane of the present invention is formed on at least one of surfaces of a positive electrode, a negative electrode, and a separator. The porous membrane of the present invention is preferably used for a nonaqueous electrolyte secondary battery that includes an electrolyte, and a laminate-type electrode group, or a wound-type electrode group. The laminate-type electrode group is formed through lamination of the porous membrane of the present invention with the positive electrode, the negative electrode, and the separator, and the wound-type electrode group is formed through lamination and winding of the porous membrane of the present invention with the positive electrode, the negative electrode, and the separator. In the description herein, the "separator" may be any film that separates the positive electrode and the negative electrode from each other, and mainly represents a separator for a secondary battery, in particular, a nonaqueous electrolyte secondary battery.

The present invention is further directed to a nonaqueous electrolyte secondary battery that includes a positive electrode, a negative electrode, a nonaqueous electrolyte, and a separator, and that has the porous membrane containing the α-alumina of the present invention, formed on at least one of surfaces of the positive electrode, the negative electrode, and the separator. Preferable examples of a method for producing the nonaqueous electrolyte secondary battery of the present invention include a production method that includes applying the slurry of the present invention on the surface of the positive electrode and/or the negative electrode and drying, to form a porous membrane. Furthermore, a production method that includes applying the above-described slurry on the surface of the separator instead of the surface of the positive electrode and/or the negative electrode and drying to form a porous membrane, may be used.

The positive electrode and the negative electrode each include an electrode mixture layer containing a binder, and an electrode active material, that is, a positive electrode active material or a negative electrode active material, in general.

More specific examples of the production method include a method in which, in the case of a method for producing a nonaqueous electrolyte secondary battery that includes a wound-type electrode group having the porous membrane formed on a negative electrode, one end of a negative electrode lead is joined to a negative electrode lead joining portion including the porous membrane on the surface, one end of the negative electrode lead is joined to a positive electrode lead joining portion, and the positive electrode and the negative electrode are laminated and wound via a separator, to structure a wound-type electrode group, and the electrode group is housed in a battery can in a state where the electrode group is disposed between upper and lower insulating rings, followed by injection of an electrolyte and then sealing with a battery cap.

The separator is a membranous porous film disposed between a positive electrode and a negative electrode in a secondary battery.

The porous film may be a porous film-like base material that contains polyolefin-based resin as a main component, that is, may be a polyolefin-based porous base material. The porous film is structured to have therein continuous pores, and allows gas and liquid to permeate from one surface toward the other surface.

The porous film exhibits a shutdown function by melting and closing pores when the battery generates heat. The porous film may be formed of one layer or a plurality of layers.

The porous film preferably has a piercing strength of not less than 3N. If the piercing strength is excessively low, in a case where an operation of laminating and winding the positive and negative electrodes and the separator or an operation of clamping the wound electrode group is performed in a battery assembly process, or in a case where, for example, a pressure is applied to the battery from outside, the separator is pierced by the positive and the negative electrode active material particles, whereby short-circuiting between the positive and the negative electrodes may occur. The piercing strength of the porous film is preferably not higher than 10N and more preferably not higher than 8N.

The thickness of the porous film may be determined as appropriate in consideration of a thickness of a nonaqueous electrolyte secondary battery material of the nonaqueous electrolyte secondary battery, and is preferably not less than 4 μm and not greater than 40 μm, more preferably not less than 5 μm and not greater than 30 μm, and even more preferably not less than 6 μm and not greater than 15 μm.

A porosity by volume of the porous film is preferably not less than 20% and not greater than 80%, and more preferably not less than 30% and not greater than 75% in order to enhance a retaining amount of the electrolyte and exhibit a function of assuredly inhibiting (shutdown) flow of excessive current at a lower temperature. An average pore diameter of the porous film is preferably not greater than 0.3 μm and more preferably not greater than 0.14 μm in order to obtain sufficient ion permeability and prevent particles from entering the positive electrode or the negative electrode when the porous film is used as the separator.

A proportion of the polyolefin-based resin in the porous film is generally not less than 50 volume %, preferably not less than 90 volume %, and more preferably not less than 95 volume % with respect to the entirety of the porous film. The polyolefin-based resin of the porous film preferably contains a high molecular weight component having a weight average molecular weight of not less than $5 \times 10^5$ and not greater than $15 \times 10^6$. In particular, a polyolefin component having a weight average molecular weight of not less than 1000000 is preferably contained as the polyolefin-based resin of the porous film, in order to enhance the strength of the porous film.

Examples of the polyolefin-based resin contained in the porous film include a high-molecular-weight homopolymer or copolymer that is obtained by polymerizing ethylene, propylene, 1-butene, 4-methyl-1-pentene, 1-hexene, and/or the like. The porous film may be a layer that contains one of the polyolefin-based resin alone, and/or a layer that contains two or more kinds of the polyolefin-based resins. As the polyolefin-based resin, a high molecular weight polyethylene that mainly contains ethylene is preferable. The porous film may contain a component other than the polyolefin as long as the function of the layer is not degraded.

An air permeability of the porous film as a Gurley value is generally in a range of not less than 30 seconds/100 cc and not greater than 500 seconds/100 cc, and preferably in a range of not less than 50 seconds/100 cc and not greater than 300 seconds/100 cc. In a case where the porous film has the air permeability in the above-described range, sufficient ion permeability can be obtained when the porous film is used as the separator.

A weight per unit area of the porous film is generally not less than 4 g/m$^2$ and not greater than 20 g/m$^2$, preferably not less than 4 g/m$^2$ and not greater than 12 g/m$^2$, and more preferably not less than 5 g/m$^2$ and not greater than 10 g/m$^2$, in view of strength, film thickness, handleability, and weight, as well as in order to enhance a weight energy density and a volume energy density of the battery in a case where the porous film is used as the separator for a secondary battery.

Next, a method for producing the porous film will be described. For example, in a case where the porous film is a porous film that contains an ultrahigh molecular weight polyolefin and a low molecular weight hydrocarbon having a weight average molecular weight of not greater than 10000, the porous film is preferably produced by the following method.

That is, the porous film can be obtained by a method that includes (1) kneading a low molecular weight hydrocarbon having a weight average molecular weight of not greater than 10000, an ultrahigh molecular weight polyolefin, and a pore-forming agent to obtain a polyolefin resin composition, (2) rolling the polyolefin resin composition by using a pressure roll to form a sheet, (3) removing the pore-forming agent from the sheet obtained in the above-described (2), and (4) stretching the sheet from which the pore-forming agent has been removed in the above-described (3). Stretching the sheet in the above-described (4) may be performed before removing the pore-forming agent from the sheet in the above-described (3).

Examples of the low molecular weight hydrocarbon include low molecular weight polyolefins such as polyolefin wax and low molecular weight polymethylenes such as Fischer-Tropsch wax. The low molecular weight polyolefin and the low molecular weight polymethylene each preferably have a weight average molecular weight of not less than 200 and not greater than 3000. In a case where the weight average molecular weight is not less than 200, there is no risk of evaporation during production of the porous film. Furthermore, the weight average molecular weight is preferably not greater than 3000 since mixture with the ultrahigh molecular weight polyolefin is more uniformly performed.

Examples of the pore-forming agent include an inorganic filler and a plasticizer. Examples of the inorganic filler include an inorganic filler that can be dissolved in an aqueous solvent containing an acid, an aqueous solvent containing an alkali, or an aqueous solvent mainly containing water.

Examples of the inorganic filler that can be dissolved in the aqueous solvent containing an acid include calcium carbonate, magnesium carbonate, barium carbonate, zinc oxide, calcium oxide, aluminum hydroxide, magnesium hydroxide, calcium hydroxide, and calcium sulfate. Calcium carbonate is preferable since cost is low and fine powder can be easily obtained. Examples of the inorganic filler that can be dissolved in the aqueous solvent containing an alkali include silicic acid and zinc oxide. Silicic acid is preferable since cost is low and fine powder can be easily obtained. Examples of the inorganic filler that can be dissolved in the aqueous solvent mainly containing water include calcium chloride, sodium chloride, and magnesium sulfate.

Examples of the plasticizer include low molecular weight nonvolatile hydrocarbon compounds such as liquid paraffin and mineral oil.

The porous membrane of the present invention is laminated on one surface or both surfaces of the separator as appropriate. The present invention also includes a laminated separator including the separator and the porous membrane, of the present invention, which is laminated on at least one of surfaces of the separator.

The laminated separator of the present invention can be produced by applying the slurry of the present invention to at least one of the surfaces of the separator. The method for applying the slurry of the present invention to the separator is not particularly limited. In a case where a layer of the porous membrane of the present invention is laminated on both surfaces of the separator, a sequential laminating method in which the porous membrane of the present invention is formed on one surface of the separator, and the porous membrane of the present invention is thereafter formed on the other surface, or a simultaneous laminating method in which the porous membrane of the present invention is simultaneously formed on both surfaces of the separator, can be adopted. Before the slurry of the present invention is applied to the separator, the surface of the separator to which the slurry of the present invention is to be applied may be hydrophilized.

Examples of a method for forming the porous membrane of the present invention include: a method in which the slurry of the present invention is directly applied to the surface of the separator, and the solvent is thereafter removed; a method in which the slurry of the present invention is applied to an appropriate supporter, the solvent is removed to form the porous membrane of the present invention, the porous membrane of the present invention and the separator are thereafter pressure-bonded to each other, and the supporter is subsequently peeled off; a method in which the slurry of the present invention is applied to an appropriate supporter, the porous film is thereafter pressure-bonded to the coated surface, the supporter is subsequently peeled off, and the solvent is thereafter removed; and a method in which the separator is dipped in the slurry of the present invention to perform dip coating, and the solvent is thereafter removed.

The thickness of the porous membrane of the present invention can be controlled by adjusting a thickness of a coating film in a wet state after application, a weight ratio between resin and particulates, or the concentration of a solid content of the slurry, i.e., the sum of the concentration of the resin and the concentration of the particulates. As the supporter, for example, a film made of resin, a belt made of metal, a drum, or the like can be used.

The method in which the slurry of the present invention is applied to the separator or the supporter is not particularly limited as long as the required weight per unit area and a coated area can be obtained. As the method for applying the slurry of the present invention, a conventionally known method can be adopted. Specific examples of the method include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, and a spray applying method.

The method for removing the solvent is a method by drying in general. Examples of the drying method include natural drying, air-blow drying, drying by heating, and drying under reduced pressure. However, any method in which the solvent can be sufficiently removed, can be used. A standard drying device can be used for the drying.

In a case where heating is performed for removing the solvent (dispersion medium) from the coating film of the slurry of the present invention formed on the separator or the supporter, the heating is performed at a temperature at which air permeability of the separator is not reduced, specifically, preferably at a temperature of not lower than 10° C. and not higher than 120° C. and more preferably at a temperature of not lower than 20° C. and not higher than 80° C. in order to prevent reduction of air permeability due to contraction of the pores of the porous film.

In the porous membrane of the present invention, a thickness per one layer is preferably not less than 0.5 μm and not greater than 15 μm, more preferably not less than 2 μm and not greater than 10 μm, and even more preferably not less than 2 μm and not greater than 5 μm.

The sum of thicknesses of the porous membrane of the present invention on both surfaces is preferably not less than 1 μm, that is, the thickness on one surface is preferably not less than 0.5 μm, in order to sufficiently prevent internal short-circuiting due to damage to the battery or the like and maintain a retaining amount of the electrolyte in the porous membrane, in the laminated separator including the porous membrane. Meanwhile, the sum of the thicknesses of the porous membrane of the present invention on both surfaces is preferably not greater than 30 μm, that is, the thickness on one surface is preferably not greater than 15 μm, in order to inhibit increase of resistance to permeation of ions such as lithium ions over the entire region of the laminated separator including the porous membrane, prevent deterioration of the positive electrode and degradation of rate characteristics and cycle characteristics in the case of the charging and discharging cycle being repeated, and inhibit increase of a distance between the positive electrode and the negative electrode and thus prevent increase of the size of the secondary battery.

In the following description for physical properties of the porous membrane of the present invention, in a case where the porous membrane of the present invention is laminated on both the surfaces of the porous film, the physical properties represent at least physical properties of the porous membrane of the present invention laminated on a surface opposing the positive electrode in the porous film in the case of a secondary battery.

A weight per unit area of one layer of the porous membrane of the present invention may be determined as appropriate in consideration of a strength, a film thickness, a weight, and handleability of the laminated separator, and is generally not less than 1 g/m$^2$ and not greater than 20 g/m$^2$, preferably not less than 4 g/m$^2$ and not greater than 15 g/m$^2$, and more preferably not less than 4 g/m$^2$ and not greater than 12 g/m$^2$ in order to enhance a weight energy density and a volume energy density of the nonaqueous electrolyte secondary battery including the laminated separator as a component. In a case where the weight per unit area of the porous membrane of the present invention is in the above-described range, the weight energy density and the volume energy density of the nonaqueous electrolyte secondary battery using the laminated separator that includes the porous membrane as a component, can be enhanced, thereby reducing the weight of the nonaqueous electrolyte secondary battery.

A porosity of the porous membrane of the present invention is preferably not less than 20 volume % and not greater than 90 volume % and more preferably not less than 30 volume % and not greater than 70 volume % in order to allow the laminated separator including the porous membrane of the present invention to have sufficient ion permeability. The diameter of the pore of the porous membrane of the present invention is preferably not greater than 1 μm and more preferably not greater than 0.5 μm in order to allow the laminated separator including the porous membrane of the present invention to have sufficient ion permeability.

The air permeability of the laminated separator of the present invention as a Gurley value is preferably not less than 30 seconds/100 mL and not greater than 1000 seconds/100 mL, and more preferably not less than 50 seconds/100 mL and not greater than 800 seconds/100 mL. In a case where the laminated separator of the present invention has the above-described air permeability, the laminated separator of the present invention used as a component for a nonaqueous electrolyte secondary battery can have sufficient ion permeability.

In a case where the air permeability is greater than a value in the above-described range, this means that porosity of the laminated separator is high, and the laminated separator thus has a coarse laminate structure, so that the strength of the laminated separator is lowered, and shape stability may become insufficient, particularly, at a high temperature. Meanwhile, in a case where the air permeability is less than a value in the above-described range, the laminated separator used as a component for a nonaqueous electrolyte secondary battery cannot have sufficient ion permeability, so that battery characteristics of the nonaqueous electrolyte secondary battery may be degraded.

This application claims priority to Japanese Patent Application No. 2018-242924 filed on Dec. 26, 2018. The entire contents of the specification of Japanese Patent Application No. 2018-242924 filed on Dec. 26, 2018 are incorporated herein by reference.

EXAMPLES

The present invention will be described below in more detail by means of examples. The present invention is not limited by the following examples, and can also be carried out with appropriate modifications being made within the range of the gist described above and below, and any of these modifications are included in the technical scope of the present invention.

Alumina powders obtained in an example and comparative examples described below were measured in the following method.

(1) Crystallite Size and Lattice Strain

X-ray diffraction measurement was performed by the 2θ/θ method for pulverized alumina powder in each of example 1 and comparative example 1, and for unpulverized alumina powder in comparative example 2, to obtain actual-measurement data of the X-ray diffraction profiles. In the X-ray diffraction measurement, D8 ADVANCE manufactured by Bruker was used, CuKα rays were used as an X-ray source, and a voltage was 40 kV and a current was 40 mA at the measurement. Scanning was performed by a continuous measurement method in a range of 2θ from 5 to 80°, at the scanning speed of 5 s, with the step width of 0.020°. Based on analyzed results of the XRD diffraction profiles by Rietveld refinement using RIETAN-FP v2.63, a value of 2θ at each of peaks at 2θ values from 40° to 80° and an integral breadth were obtained, and the crystallite size and the lattice strain were assessed by the above-described Halder-Wagner method.

(2) BET Specific Surface Area by Nitrogen Adsorption Method

For aluminum hydroxide powder, raw material alumina powder, alumina powder obtained by pulverizing raw material alumina powder, and unpulverized alumina powder, a nitrogen adsorption BET specific surface area was obtained by a one-point method in a nitrogen adsorption method by using "FlowSorb III 2310" manufactured by Shimadzu Corporation as a specific surface area measuring apparatus, in compliance with the method specified in JIS-Z8830 (2013). The measurement conditions were as follows.

Carrier gas: nitrogen/helium mixed gas
Filling amount of sample: 0.1 g
Sample pretreatment condition: treatment at 200° C. for 20 minutes
Nitrogen adsorption temperature: liquid nitrogen temperature (not higher than −196° C.)
Nitrogen desorption temperature: room temperature (about 20° C.)

(3) Ratio of BET Specific Surface Area by Water Adsorption Method to BET Specific Surface Area by Nitrogen Adsorption Method A water adsorption BET specific surface area was measured by using "BELSORP-18" manufactured by MicrotracBEL Corp. in a multipoint method. The measurement conditions were as follows. In the water adsorption cross-sectional area of 0.125 $nm^2$ and under the relative pressure P/P0=0.1 to 0.3 as a range of analysis of the water adsorption BET specific surface area, the water adsorption BET specific surface area was calculated, and the water adsorption BET specific surface area was divided by the nitrogen adsorption BET specific surface area calculated in the above-described (2) to obtain the ratio.

The measurement conditions were as follows.
Filling amount of sample: 1 g
Sample pretreatment condition: treatment under vacuum at 150° C. for five hours
Temperature of thermostatic chamber: 50° C.
Adsorption temperature: 25° C.
Saturated vapor pressure: 3.169 kPa
Adsorption equilibrium time: 500 seconds (4) Measurement of Powder Particle Size Distribution A particle size distribution of each of aluminum hydroxide powder, raw material alumina powder, and alumina powder obtained by pulverizing unpulverized alumina powder was measured in a laser diffraction method by using "Microtrac MT3300 EXII" manufactured by MicrotracBEL Corp. as a laser particle size distribution measurement apparatus, to obtain a particle diameter D50 equivalent to 50% cumulative percentage by volume. Furthermore, for the alumina powder obtained by pulverizing the raw material alumina powder in each of example 1 and comparative example 1, and the unpulverized alumina powder in comparative example 2, a particle diameter D90 equivalent to 90% cumulative percentage by volume was also obtained. Powder dispersion liquid obtained by adding powder to be measured, to 0.2 mass % of aqueous sodium hexametaphosphate solution, so as to obtain a proper laser scattering intensity, and dispersing the powder at 40 W by an ultrasonic wave built in the device for five minutes, was used as the measurement sample. The refractive index of the aluminum hydroxide was 1.57 and the refractive index of the alumina was 1.76.

(5) Measurement of Particle Size Distribution of Alumina Powder in Slurry

A solution was obtained by dissolving PVDF-HFP (poly(vinylidene fluoride-hexafluoropropylene), Solef21510 manufactured by Solvay) in N-methyl-2-pyrrolidone (NMP) solvent so as to contain 2 mass % of the PVDF-HFP. The alumina powder was added to the solution, stirred, and mixed such that 10 parts by mass of the PVDF-HFP was contained with respect to 100 parts by mass of alumina to obtain a slurry. The slurry was measured by using a laser particle size distribution measurement apparatus ["Microtrac MT3300 EXII" manufactured by MicrotracBEL Corp.] in a laser diffraction method, and a particle size distribution of the alumina in the slurry was measured, to obtain a particle diameter D50 equivalent to 50% cumulative percentage by volume, a particle diameter D90 equivalent to 90% cumulative percentage by volume, and a particle diameter D100 equivalent to 100% cumulative percentage by volume. The slurry subjected to dispersion treatment at 40 W by an ultrasonic wave built in the device for five minutes, was used as a measurement sample. The refractive index of the alumina was 1.76.

Example 1

Aluminum hydroxide powder in which the particle diameter D50 equivalent to 50% cumulative percentage by volume was 4 μm, the BET specific surface area was 1.7 $m^2/g$, and an amount of Na was 0.03 mass %, was obtained by the Bayer process. The aluminum hydroxide powder was calcined by a tunnel kiln at 1280° C. for two hours, thereby obtaining raw material alumina powder, in which the BET specific surface area was 3.8 $m^2/g$, and the particle diameter D50 equivalent to 50% cumulative percentage by volume was 5 μm.

Next, 0.2 mass % of propylene glycol (indicated as "PG" in Table 1) as an adhesion inhibitor in a pulverizer was added to the raw material alumina powder, and the raw material alumina powder was pulverized by a jet mill under the following conditions, to obtain α-alumina powder having physical properties indicated below in Table 1.

(Jet Mill Conditions)
Device: PJM-280SP manufactured by Nippon Pneumatic Mfg. Co., Ltd.
Feeding rate of alumina raw material powder: 10 kg/h
Gauge pressure at air supply port during pulverization: 0.7 MPa Comparative Example 1

Aluminum hydroxide powder in which the particle diameter D50 equivalent to 50% cumulative percentage by volume was 50 μm, the BET specific surface area was 0.2 m²/g, and an amount of Na was 0.13 mass %, was obtained by the Bayer process. The aluminum hydroxide powder was calcined by a rotary kiln, thereby obtaining raw material alumina powder in which the BET specific surface area was 3.7 m²/g, and the particle diameter D50 equivalent to 50% cumulative percentage by volume was 54 μm.

The raw material alumina powder was pulverized by a vibration mill under the following conditions to obtain α-alumina powder having physical properties indicated below in Table 1.

(Vibration Mill Conditions)
Device: YAMP-4JNT manufactured by URAS TECHNO CO., LTD
Pot volume: 2 liters
Pot material: alumina
Pulverization medium: φ15 mm alumina ball
Filling amount of pulverization medium: 3 kg
Charged amount of raw material alumina: 50 g
Pulverization amplitude: 3 mm
Pulverization time: 3 hours Comparative Example 2

Aluminum hydroxide powder in which the particle diameter D50 equivalent to 50% cumulative percentage by volume was 50 μm, the BET specific surface area was 0.2 m²/g, and an amount of Na was 0.13 mass %, was obtained by the Bayer process for which the same conditions as in comparative example 1 were adopted. The aluminum hydroxide powder was calcined by a rotary kiln, thereby obtaining raw material alumina powder in which the BET specific surface area was 3.7 m²/g, and the particle diameter D50 equivalent to 50% cumulative percentage by volume was 54 μm.

Results of measurement of the pulverized alumina powder obtained in each of example 1 and comparative example 1 and the raw material alumina powder obtained in comparative example 2 according to the above-described (1) to (5) are indicated in

TABLE 1

| | Conditions of producing alumina | | | | | | | Physical properties of alumina powder | | | | | | | | |
|---|---|---|---|---|---|---|---|---|---|---|---|---|---|---|---|---|
| | Aluminum hydroxide | | | Raw material alumina | | | | | | | | | | Particle size dispersed in NMP/PVDF | | |
| | BET specific surface area by nitrogen D50 (μm) | Amount of Na (mass %) | Kiln | BET specific surface area by nitrogen (m²/g) | D50 (μm) | Pulverizing method | adhesion inhibitor | crystallite size (nm) | lattice strain (—) | Water BET/ Nitrogen BET | BET specific surface area by nitrogen (m²/g) | D50 (μm) | D90 (μm) | D50 (μm) | D90 (μm) | D100 (μm) |
| | D50 (μm) | | | | | | | | | | | | | | | |
| Example 1 | 4 | 1.7 | 0.03 | Tunnel kiln | 3.8 | 5 | Jet mill | PG 0.2% | 87 | 0.0003 | 0.68 | 4.5 | 1.1 | 2.0 | 1.5 | 2.3 | 4.6 |
| Comparative Example 1 | 50 | 0.2 | 0.13 | Rotary kiln | 3.7 | 54 | Vibration mill | Absence | 81 | 0.0022 | 1.36 | 7.1 | 0.5 | 3.4 | 1.1 | 21 | 125 |
| Comparative Example 2 | 50 | 0.2 | 0.13 | Rotary kiln | 3.7 | 54 | Absence | Absence | 97 | 0.0004 | 0.90 | 3.7 | 54 | 85 | 60 | 93 | 209 |

According to Table 1, in example 1, it is found that the α-alumina powder having the crystallite size of not greater than 95 nm and the lattice strain of not greater than 0.0020 could be obtained and D90 and D100 had small values in the slurry containing the α-alumina powder, the binder, and the solvent, that is, generation of coarse particles was inhibited. In example 1, the aluminum hydroxide powder in which the values of the particle diameter D50 equivalent to 50% cumulative percentage by volume, the BET specific surface area, and the amount of Na were appropriately adjusted was calcined to prepare the raw material alumina powder, and the raw material alumina powder was pulverized by the jet mill to obtain the α-alumina powder. Meanwhile, the α-alumina powder of comparative example 1 had the lattice strain of greater than 0.0020, and D90 and D100 were each large in the slurry containing the α-alumina powder, the binder, and the solvent, that is, coarse particles were generated. In comparative example 1, the aluminum hydroxide powder in which the value of the particle diameter D50 equivalent to 50% cumulative percentage by volume was large, the BET specific surface area was small, and the amount of Na was large, was calcined to prepare the raw material alumina powder, and the raw material alumina powder was pulverized by the vibration mill to obtain the α-alumina powder. Furthermore, the raw material alumina powder obtained merely by calcining the same aluminum hydroxide powder as in comparative example 1, that is, the unpulverized alumina powder, had the crystallite size of greater than 95 nm, and D90 and D100 were each large in the slurry containing the unpulverized alumina powder, the binder, and the solvent, that is, coarse particles were generated.

The invention claimed is:

1. An α-alumina wherein
a crystallite size obtained by a Rietveld analysis is not greater than 95 nm, and
a lattice strain obtained by the Rietveld analysis is not greater than 0.0020.

2. The α-alumina according to claim 1, wherein a BET specific surface area by a nitrogen adsorption method is not greater than 10 $m^2/g$.

3. The α-alumina according to claim 1, wherein a particle diameter D50 equivalent to 50% cumulative percentage by volume is not greater than 2μm.

4. The α-alumina according to claim 1, wherein
the crystallite size is not less than 50 nm and not greater than 95 nm, and
the lattice strain is not less than 0.0001 and not greater than 0.0010.

5. A slurry comprising:
the α-alumina according to claim 1;
a binder; and
a solvent.

6. A porous membrane comprising the α-alumina according to claim 1.

7. A laminated separator comprising:
a separator; and
the porous membrane, according to claim 6, laminated on at least one of surfaces of the separator.

8. A nonaqueous electrolyte secondary battery comprising:
a positive electrode;
a negative electrode;
a nonaqueous electrolyte; and
a separator, wherein
the porous membrane according to claim 6 is formed on at least one of surfaces of the positive electrode, the negative electrode, and the separator.

9. A method for producing a nonaqueous electrolyte secondary battery comprising a positive electrode, a negative electrode, a nonaqueous electrolyte, and a separator, the method comprising:
applying the slurry according to claim 5 to at least one of surfaces of the positive electrode, the negative electrode, and the separator; and
drying the slurry to form a porous membrane on the at least one of the surfaces.

10. The α-alumina according to claim 2, wherein a particle diameter D50 equivalent to 50% cumulative percentage by volume is not greater than 2 μm.

11. The α-alumina according to claim 10, wherein
the crystallite size is not less than 50 nm and not greater than 95 nm, and
the lattice strain is not less than 0.0001 and not greater than 0.0010.

* * * * *